United States Patent [19]
Nakano et al.

[11] Patent Number: 5,705,275
[45] Date of Patent: Jan. 6, 1998

[54] THERMOSETTING RESIN COMPOSITION AND TWO-PARTS COMPOSITE BODY THEREOF WITH SILICONE RUBBER

[75] Inventors: Sadao Nakano; Susumu Iwama; Mikio Kiyosawa, all of Nagano-ken, Japan

[73] Assignee: Shin-Etsu Polymer Co., Ltd., Tokyo, Japan

[21] Appl. No.: 758,398

[22] Filed: Nov. 29, 1996

[51] Int. Cl.⁶ .................. B32B 7/10; B32B 25/08
[52] U.S. Cl. ............. 428/413; 428/420; 428/447; 428/451; 428/482; 525/30; 525/31
[58] Field of Search .................. 428/447, 451, 428/482, 413, 420; 525/30, 31

[56] References Cited

U.S. PATENT DOCUMENTS 3,508,951  4/1970  Shimp ......................... 525/30

FOREIGN PATENT DOCUMENTS

| | | |
|---|---|---|
| 0 031 434 | 7/1981 | European Pat. Off. . |
| 0 168 955 | 1/1986 | European Pat. Off. . |
| 2254343 | 11/1972 | Germany . |
| 2014159 | 8/1979 | United Kingdom ............ 525/30 |

OTHER PUBLICATIONS

*Database WPI*, Week 9418, AN 94–146884 (abstract of JP 06–060767) (Mar. 1994).
*Database WPI*, Week 8222, AN 82–44511E (abstract of JP 57–066376) (Apr. 1982).
*Database WPI*, Week 8929, AN 89–211545 (abstract of JP 01–149862) (Jun. 1989).

*Primary Examiner*—Patricia A. Short
*Attorney, Agent, or Firm*—Wenderoth, Lind & Ponack

[57] ABSTRACT

Disclosed is a novel thermosetting resin composition suitable for the preparation of an integrally molded two-parts composite body consisting of a first part of a cured silicone rubber and a second part of a cured thermosetting resin without intervention of an adhesive layer at the interface. The thermosetting resin composition comprises:

(a) 100 parts by weight of an unsaturated polyester resin;
(b) from 20 to 50 parts by weight of an ethylenically unsaturated polymerizable compound such as diallyl phthalate;
(c) from 5 to 30 parts by weight of an epoxy resin;
(d) from 2 to 20 parts by weight of a melamine resin;
(e) from 0.1 to 2 parts by weight of a radical-reactive curing agent which is an organic peroxide; and
(f) from 0.1 to 2 parts by weight of an acidic catalyst such as aromatic sulfonic acid derivatives.

2 Claims, 5 Drawing Sheets

FIG. IA
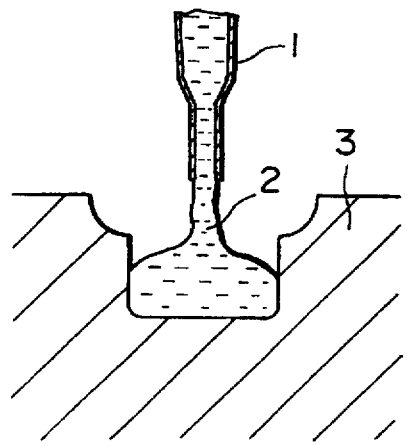
FIG. IB
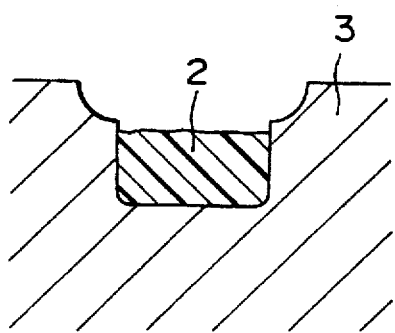
FIG. IC
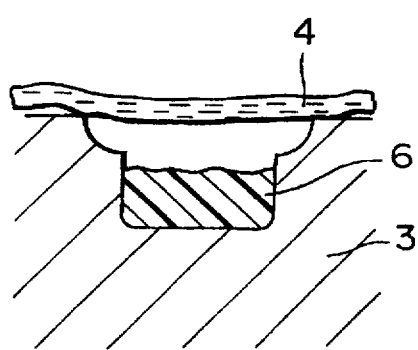
FIG. ID
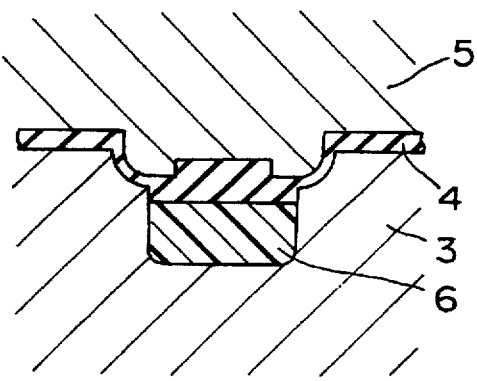
FIG. IE
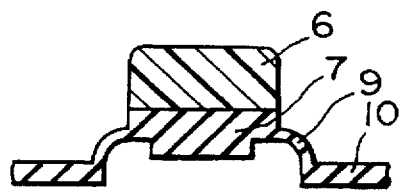

THERMOSETTING RESIN COMPOSITION AND TWO-PARTS COMPOSITE BODY THEREOF WITH SILICONE RUBBER

BACKGROUND OF THE INVENTION

The present invention relates to a thermosetting resin composition and also relates to a two-parts composite body consisting of a first part of a cured silicone rubber and a second part of a thermosetting resin composition integrally bonded without intervention of an adhesive layer. More particularly, the invention relates to a thermosetting resin composition capable of bonding to the surface of a silicone rubber body, upon which the resin composition is cured, to exhibit a high bonding strength even without the use of any adhesives.

It is a trend in recent years that two-parts composite bodies, which consist of a first part having rubbery elasticity as formed from a rubber having a Shore A hardness, for example, in the range from 30 to 80, and a second part made from a cured and rigid resin having a Shore D hardness of, for example, at least 40, integrally bonded to the first part, if possible, without use of an adhesive, are sometimes required in various applications. One of the typical examples of such two-parts composite bodies is a so-called push button switch covering member of a keyboard switch panel for various kinds of electronic instruments. A push button switch covering member in general has a structure of a continuum consisting of a plurality of unit push button switches each having a structure illustrated in FIG. 7 of the accompanying drawing by a vertical cross sectional view consisting of a base part 75, a riser part 74 and a keytop base 72 integrally molded from a rubbery material and a keytop 71 made from a rigid resinous material and bonded to the keytop base 72 while a movable contact point 76 made from an electroconductive rubbery material is bonded to the lower surface of the keytop base 72. When the keytop 71 is pushed down by the fingertip of an operator, the riser part 74 is bent and the movable contact point 76 is brought into contact with a pair of fixed contact points (not shown in the figure) on the circuit board below (not shown in the figure) on which the push button switch covering member is mounted at the base part 75, so as to close the electric circuit between the fixed contact points. When the pushing force to the keytop 71 is released, the riser part 74 regains the undepressed form by the resilience of the rubbery material so that the movable contact point 76 is pulled up apart from the fixed contact points to open the electric circuit.

The rubbery material forming the base part 75, riser part 74 and keytop base 72 is required to have a Shore A hardness of 80 or lower in order to ensure good working behavior in the above described pushing and releasing operations as well as to ensure good position adjustability in mounting of the covering member on a circuit board. Among various kinds of rubbery materials, silicone rubbers are preferable in most cases in respects of their excellent electric properties, precision moldability and durability in repeated bending and releasing movements.

On the other hand, the keytop 71 is made from a rigid thermosetting resin having, preferably, a Shore D hardness of 40 or higher. This is because, when the keytop 71 is molded from a rubbery material integrally with the other parts, the top surface of the keytop 71 more or less has tackiness inherent in rubbery materials so as to disturb smoothness of the button-pushing operation. In addition, the fatty excreta excreted from the finger tip of the operator are absorbed by and infiltrate the rubbery material from the top surface of the keytop 71 to cause discoloration and degradation in the properties, e.g., mechanical strengths, of the rubber-made keytop. When the movable contact point 76 below the keytop is contaminated with the fatty excreta by migration through the keytop 71 and keytop base 72, an increase is caused in the electric resistance of the electroconductive rubbery material forming the movable contact point 76 to decrease the reliability of switching.

It is of course that a piece for the keytop 72 is separately prepared from a thermosetting resin and the piece is bonded to the upper surface of the rubbery keytop base 72 by using an adhesive. This method, however, is not practical because of the increased complicacy in the manufacturing process of the push button switch covering members if not to mention the disadvantage caused by the unevenness in the adhesive bonding between a rubbery keytop base 72 and the rigid resinous keytop 71. The above described situations form the reason for the recent trend that the push button switch covering member is prepared in a two-parts composite body integrally molded without using an adhesive for adhesive bonding of the resinous keytop 71 to the rubbery keytop base 72.

In the prior art, various attempts and proposals have been made heretofore for a thermosetting resin which can be integrally bonded to the surface of a silicone rubber part by means of a chemical reaction forming chemical bonds without using an adhesive. A class of the thermosetting resin compositions of this type includes those disclosed in Japanese Patent Kokai 6-309988 which are high-hardness silicone resins including methyl silicone resins, phenyl silicone resins, dimethyl diphenyl silicone resins and the like. The other class of the thermosetting resin compositions includes those disclosed in Japanese Patent Kokai 6-60767 consisting of a polyfunctional compound of which the concentration of the unsaturated groups is at least $6 \times 10^{-4}$ moles/ml admixed with an organic peroxide to be imparted with thermal curability. The above mentioned polyfunctional compound is exemplified by ethyleneglycol dimethacrylate, diethyleneglycol dimethacrylate and the like.

Each of the above described prior art thermosetting resins chemically bondable to a silicone rubber has its own advantages and disadvantages. For example, the high-hardness silicone resins disclosed in Japanese Patent Kokai 6-309988 each have very high transparency comparable to poly (methyl methacrylate) resins and polycarbonate resins and are capable of giving a resin-made part with a total light transmissivity of 90% or even higher to enable preparation of colored parts in any bright colors. In addition, these resins exhibit a linear shrinkage in molding approximately equivalent to that of silicone rubbers so that the integrally molded two-parts body is free from the troubles of warping or distortion due to difference in the molding shrinkage between the two parts. On the other hand, the mechanical strength or, in particular, impact strength of these silicone resins is relatively low so that, when the thickness of the keytop 71 is small, for example, to be smaller than 2.3 mm in a push button switch covering member, cracks are sometimes formed in the keytop 71 in a mechanical shock test in which the covering member is dropped from a height of about 2 meters onto the floor covered with resin tiles so that carefulness is required in handling of such push button switch covering members.

In contrast thereto, the thermosetting resins disclosed in Japanese Patent Kokai 6-60767 generally have a relatively high mechanical strength as an inherency of the resin so as to clear the above mentioned mechanical shock test.

Nevertheless, the application fields of these resins are limited because, since the resins have a Shore D hardness of 50 to 60, the resin surface is susceptible to scratch formation even by scratching with a finger nail or a pencil tip. In addition, these resins have another problem relating to the molding shrinkage usually exhibiting a linear shrinkage of as large as 7 to 8% as is explained by making reference to FIGS. 8A to 8E illustrating the integral molding procedure with a silicone rubber for the preparation of a push button switch covering member by a cross section. Namely, the flowable resin composition 82 is cast from the dispenser nozzle 81 into the cavity of a lower mold 83, as is illustrated in FIG. 8A, to fill up the cavity (see FIG. 8B). After curing of the thermosetting resin composition by heating in situ in the cavity of the lower mold 83 to form a cured keytop 86, as is illustrated in FIG. 8C, a sheet of an uncured silicone rubber stock 84 is mounted to cover the cavity of the lower mold 83 and compression-molded with the upper mold 85 (see FIG. 8D) to close the metal mold into a cured silicone rubber part consisting of the base part 75, riser part 74 and keytop base 72, which is integrally bonded to the resin-made keytop 86 as is illustrated in FIG. 8E.

As a consequence of the large molding shrinkage of the resin composition 82, it is unavoidable that a large gap space 90 is formed around the cured resin part 86 with the wall of the cavity of the lower mold 83 as is illustrated in FIG. 8C so that the silicone rubber stock 84 under compression molding naturally intrudes into and fills up the gap space 90 around the cured resinous keytop 86 as is illustrated in FIG. 8D and cured therein to be bonded to the resin part 86 although the joint surface between the two parts cannot be even with irregular joint line between the parts appearing on the side wall of the keytop 86 as is illustrated in FIG. 8E. Moreover, the large difference in the molding shrinkage between the rubber part 72 and the resin part 86 may eventually cause warping or deformation of the two-parts composite body as molded.

Further, the thermosetting resin disclosed in Japanese Patent Kokai 6-60767, as compared with those disclosed in Japanese Patent Kokai 6-309988, in the course of curing rapidly loses bondability with a silicone rubber so that the integral molding process thereof with a silicone rubber part is not versatile enough. Moreover, the resin composition is not highly transparent so that the keytops molded with the resin composition cannot be brightly colored.

SUMMARY OF THE INVENTION

The present invention accordingly has an object to provide a novel and improved thermosetting resin composition capable of being integrally molded with a silicone rubber, without using any adhesives, to give a two-parts composite body without the disadvantage due to a large difference in the molding shrinkage between the resin composition and the silicone rubber composition, of which the cured resin part has excellent mechanical strengths along with high transparency to permit coloration of the resin part in any desired colors. The invention also has an object to provide a two-parts composite body consisting of a cured resin part obtained from the novel resin composition referred to above and a part of a cured silicone rubber integrally and directly bonded together without intervention of an adhesive layer therebetween.

Thus, the thermosetting resin composition of the invention suitable for integral bonding to a part of a cured silicone rubber without intervention of an adhesive layer at the interface is a uniform blend which comprises:

(a) 100 parts by weight of an unsaturated polyester resin;
(b) from 20 to 50 parts by weight of an ethylenically unsaturated polymerizable compound;
(c) from 5 to 30 parts by weight of an epoxy resin;
(d) from 2 to 20 parts by weight of a melamine resin;
(e) from 0.1 to 2 parts by weight of a radical-reactive curing agent; and
(f) from 0.1 to 2 parts by weight of an acidic catalyst.

The two-parts composite body provided by the invention, such as a push button switch covering member, is an integral body which consists of:

(A) a first cured part molded from a silicone rubber composition, of which the organopolysiloxane molecules have at least one vinyl group bonded to the silicon atom in a molecule; and (B) a second cured part molded from a thermosetting resin composition which is a uniform blend comprising:

(a) 100 parts by weight of an unsaturated polyester resin;
(b) from 20 to 50 parts by weight of an ethylenically unsaturated polymerizable compound;
(c) from 5 to 30 parts by weight of an epoxy resin;
(d) from 2 to 20 parts by weight of a melamine resin;
(e) from 0.1 to 2 parts by weight of a radical-reactive curing agent; and
(f) from 0.1 to 2 parts by weight of an acidic catalyst, the first part and the second part being joined together without intervention of a layer of an adhesive at the interface.

BRIEF DESCRIPTION OF THE DRAWING

FIGS. 1A to 1E each illustrate one of the steps in the integral molding process of a push button switch covering member by the use of the inventive thermosetting resin composition by a vertical cross sectional view.

DETAILED DESCRIPTION OF THE PREFERRED EMBODIMENTS

As is summarized above, the thermosetting resin composition suitable for integral bonding to the surface of a cured silicone rubber without intervention of an adhesive layer therebetween is a uniform blend comprising the essential ingredients including the components (a) to (f) each in a specified weight proportion relative to the component (a).

The component (a) is an unsaturated polyester resin which is not limited to a particular type but can be any of the isophthalic acid-based polyester resins, orthophthalic acid-based polyester resins, bisphenol-based polyester resins and others without particular limitations. Various commercial products belonging to these classes are available on the market and can be used as such including those sold under the trade names off Estars 1510C, CL1270 and C0600-1 (each a product by Mitsui-Toatsu Kagaku Co.), Upicas 2035, 2239 and 2253 (each a product by Nippon Upica Co.), Polyreal (a product by Takeda Pharmaceutical Co.), Polylite (a product by Dai-nippon Ink Chemical Co.), Rigolac (a product by Showa High-polymer Co.) and so on. Choice of the unsaturated polyester resin from these commercial products naturally depends on the particular requirements for the properties of the resin-made part such as high transparency, excellent resistance against crack formation and so on according to the intended application of the two-parts composite body.

Figure 6:
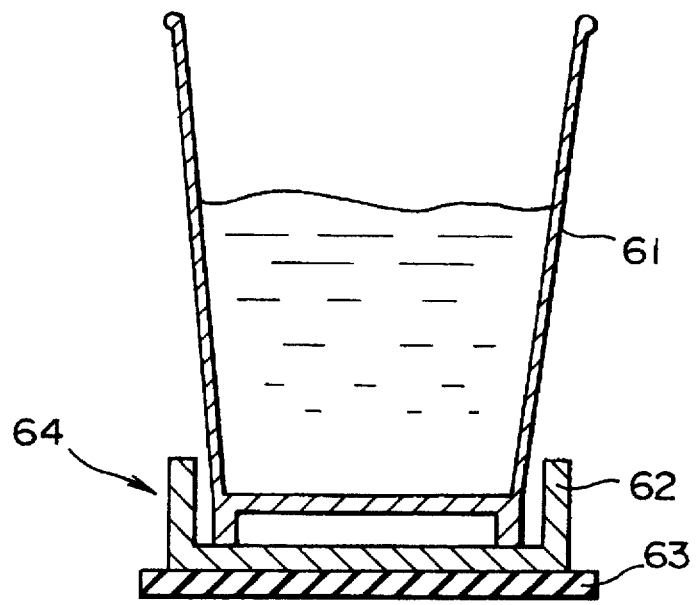
FIG. 6 is an axial cross sectional view of a coaster which is a two-parts composite body consisting of a resinous coaster body and a rubber-made coaster base, a cup with drink being mounted thereon.
Figure 7:
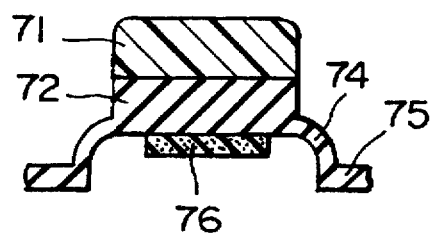
FIG. 7 is a vertical cross sectional view illustrating the structure of a push button switch covering member.
Figure 8A:
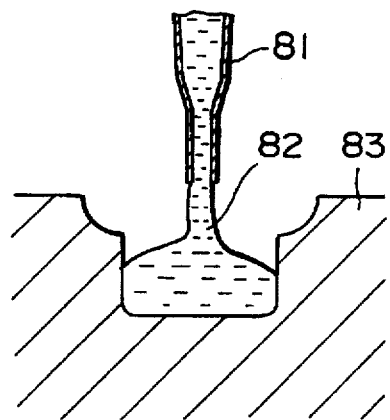
FIGS. 8A to 8E each illustrate one of the steps in the integral molding process of a push button switch covering member by the use of a conventional thermosetting resin composition by a vertical cross sectional view.
Figure 8B:
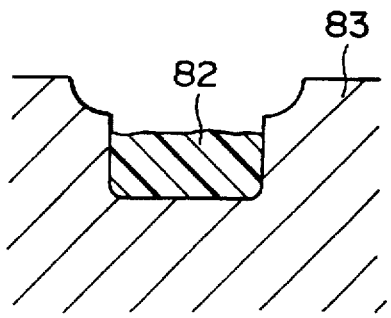
Figure 8C:
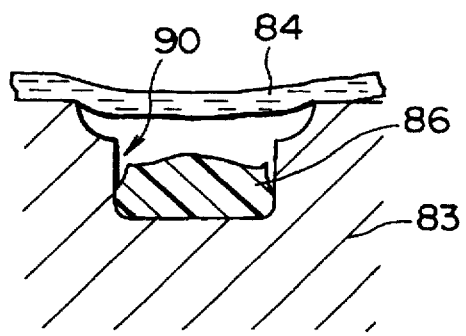
Figure 8D:
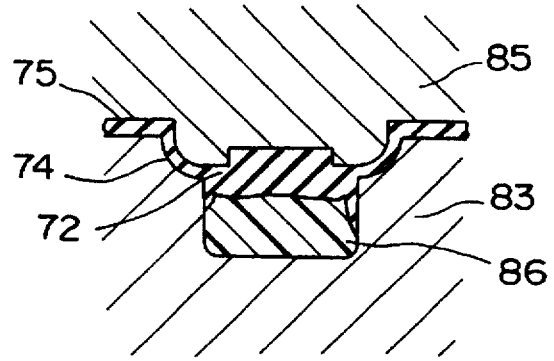
Figure 8E:
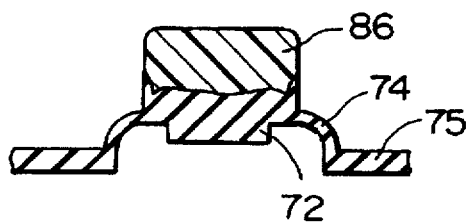

The component (b) is an ethylenically unsaturated polymerizable compound or, typically, a vinyl or allyl compound which dually serves as a crosslinking agent for the unsaturated polyester resin and as a bonding promoter between the resinous surface and the silicone rubber surface. Examples of such an ethylenically unsaturated polymerizable compound include styrene, i.e. vinyl benzene, vinyl toluenes, diallyl phthalate, triallyl cyanurate and the like, of which diallyl phthalate is preferable in respects of the low vaporizability thereof and the improvement in the abrasion resistance imparted to the cured part obtained from the inventive resin composition to be suitable for the molding of a precision-molded articles such as push button switch covering members as a typical product while styrene is preferable in respect of the curability of the resin composition compounded therewith at a relatively low temperature around room temperature to meet the requirements in the preparation of a packing or gasket member and the like. Triallyl cyanurate is preferable in respect of the improvement in the heat resistance of the cured resin composition so that the thermosetting resin composition of the invention compounded with triallyl cyanurate is suitable, for example, for the fabrication of a coaster to mount a hot cup having a slip-preventing coaster-base of a silicone rubber as is illustrated in FIG. 6. In addition to the above described various monomeric compounds as the component (b), it is sometimes advantageous to use an diester of a long-chain glycol compound with (meth)acrylic acid such as polyethyleneglycol dimethacrylates in an amount in the range from 10 to 20 parts by weight per 100 parts by weight of the component (a) when certain flexibility is desired in the resin-made part along with an improvement in the mold-releasability of the resin-made part after curing.

The component (c) in the inventive thermosetting resin composition is an epoxy resin which serves to improve the mechanical strengths of the cured part of the resin composition and to decrease the molding shrinkage of the resin composition. Various kinds of suitable commercial products are available on the market including: neopentylglycol diglycidyl ether sold under the trade name of Epiol NPG-100 (a product by Nippon Oil & Fat Co.), propyleneglycol diglycidyl ether sold under the trade name of Epiol P-400 (a product by the company supra), a diglycidyl ether with addition of 2 moles of a bisphenol A peroxide or a so-called BP-A diglycidyl ether sold under the trade name of Epolite 3002 (a product by Kyoei Chemical Co.), ethyleneglycol diglycidyl ether sold under the trade name of Epolite 40E (a product by the company supra) and so on. Although any of these epoxy resins can be used in the formulation of the inventive thermosetting resin composition, it is preferable to use an epoxy resin having a vinyl group in the molecular structure along with an epoxy group in respect of the promoting effect on the crosslinking reaction of the resin composition and prevention of yellowing of the resin composition by heat under the molding process. Examples of commercial products of such a vinyl-containing epoxy resin include Bleumar G (a product by Nippon & Fat Co.) as a glycidyl methacrylate, Lite Ester DE (a product by Kyoei Chemical Co.) as a diethylaminoethyl methacrylate, Lite Ester G (a product by the company supra) as a glycidyl methacrylate and so on.

The component (d) is a melamine resin which can be freely selected from methylolated melamine resins, butylolated melamine resins and methylolated-butylolated melamine resins without particular limitations although butylolated melamine resins are preferred in respect of little troubles due to gas generation in the course of the curing reaction. Some examples of suitable commercial products of melamine resins include Cymels 303,701 and 232 and Micoat 506 (each a product by Mitsui Cyanamide Co.), 21R and 120 (each a product by Mitsui Toatsu Kagaku Co.) and so on.

The component (e) is a radical-reactive curing agent or, namely, an initiator for a radical reaction. Organic peroxide compounds usually serve for the purpose including ketone peroxides, peroxy ketals, hydroperoxides, dialkyl peroxides, diacyl peroxides, peroxy esters and the like, from which choice is made in consideration of the requirements for the curing temperature and curing time. Peroxy ketals and peroxy esters are preferred in respect of the good storability of the resin composition compounded therewith and the relatively short molding cycle thereof. Hydroperoxides and dialkyl peroxides are generally not suitable for the purpose of high-cycle production because of their relatively high one-minute half-period temperature which is the temperature at which half-period of the peroxide compound by the thermal decomposition is 1 minute.

Some examples of the peroxide compounds suitable as the component (e) include: methyl ethyl ketone peroxide (Permek N), 1,1-bis(tert-butylperoxy-3,3,5-trimethyl) cyclohexane (Perhexa 3M), n-butyl-4,4-bis(tert-butylperoxy) valerate (Perhexa V), 2,2-bis(tert-butylperoxy) butene (Perhexa 22), benzoyl peroxide (Niper BW), m-trioleyl peroxide (Niper BMT-K40, tert-butylperoxy isopropyl carbonate (Perbutyl I) and the like, each being a product by Nippon Oil & Fat Co.

Finally, the component (f) is an acidic catalyst which acts as a curing accelerator of the melamine resin as the component (d). The acidic catalyst can be of the aromatic sulfonic acid type or a phosphoric acid type. Examples of suitable commercial products include Catalyst 4050, which is of the aromatic sulfonic acid type, and Catalyst 296-9, which is of the phosphoric acid type, each being a product by Mitsui Cyanamide Co.

It is of course optional that the inventive thermosetting resin composition is colored by compounding with a suitable organic or inorganic coloring agent or pigment such as phthalocyanine blue, disazo yellow and the like as the examples of the organic pigment and titanium dioxide, carbon black, Prussian blue, ultramarine, cobalt blue and the like as the examples of the inorganic pigment. These coloring agents can be compounded also in the silicone rubber composition from which the cured silicone rubber part of the inventive two-parts composite body is obtained with the inventive thermosetting resin composition.

The amount of each of the above described essential ingredients to form the inventive thermosetting resin composition must be within a specified range of the weight proportion relative to the component (a). For example, the amount of the ethylenically unsaturated polymerizable compound as the component (b) is in the range from 20 to 50 parts by weight per 100 parts by weight of the component (a). When the amount of the component (b) is too small relative to the component (a), the thermosetting resin composition cannot be fully cured or curing thereof is greatly retarded not to exhibit excellent bonding to the silicone rubber part. When the amount thereof is too large, on the other hand, a decrease is caused in the mechanical strenths of the thermosetting resin after curing.

The amount of the epoxy resin as the component (c) is in the range from 5 to 30 parts by weight per 100 parts by weight of the component (a). When the amount of the component (c) is too small, the thermosetting resin composition would exhibit a large shrinkage in molding along with a decrease in the mechanical strenths of the resin composition after curing. When the amount thereof is too large, on the other hand, almost no molding shrinkage is exhibited by the thermosetting resin composition so as to cause a difficulty in the removal of the molded and cured resin part from the metal mold resulting in a decrease in the productivity of the molding process and yield of acceptable molded products of the resin composition or the two-parts composite body of the invention.

The amount of the melamine resin as the component (d) is in the range from 2 to 20 parts by weight per 100 parts by weight of the component (a). When the amount of the component (d) is too small, the bonding strength of the cured part of the resin composition to the surface of a silicone rubber cannot be high enough while, when the amount thereof is too large, the cured body of the thermosetting resin composition sometimes involves voids due to gas evolution in the course of molding and curing.

The amount of the radical-reactive curing agent as the component (e) is in the range from 0.1 to 2 parts by weight per 100 parts by weight of the component (a) depending on the types of the curing agent. When the amount of the component (e) is too small, the thermosetting resin composition cannot be fully cured as a matter of course while, when the amount thereof is too large, the resin composition exhibits a great molding shrinkage resulting in the formation of cracks or poor appearance of the molded and cured body of the resin composition.

The amount of the acidic catalyst as the component (f) is in the range from 0.1 to 2 parts by weight per 100 parts by weight of the component (a). When the amount of the component (f) is too small, the melamine resin cannot be cured to a full extent resulting in a decrease in the bonding strength between the cured resin part and the silicone rubber part. When the amount thereof is too large, on the other hand, curing of the melamine resin is promoted SO much that the cured body of the thermosetting resin composition may sometimes involve voids due to gas formation.

The two-parts composite body of the invention is a firmly integrated body consisting of a cured part of the above described thermosetting resin composition and a cured silicone rubber part by forming chemical bonds therebetween without intervention of any adhesive layer. It is a presumable mechanism that the above mentioned chemical bonds are formed by the reaction between the vinyl groups bonded to the silicon atoms in the silicone rubber and the ethylenically unsaturated polymerizable compound in the thermosetting resin composition. Needless to say, it is not always necessary that the surfaces of the resin part and the silicone rubber part are flat but can be curved or rugged provided that a substantial contacting area can be obtained between the two parts.

Though not particularly limitative, the cured body of the inventive thermosetting resin composition should have a Shore D hardness of 60 or higher.

The silicone rubber part of the inventive two-parts composite body is molded from a silicone rubber composition of which the organopolysiloxane molecules each have at least one vinyl group bonded to the silicon atom as in the methyl vinyl silicone rubbers, diphenyl divinyl silicone rubbers and the like. The silicone rubber composition is prepared by compounding 100 parts by weight of a silicone rubber compound with 0.5 to 5 parts by weight of a radical-reactive curing agent which is typically an organic peroxide. When the amount of the curing agent is too small, the rubber composition cannot be fully cured as a matter of course while, when the amount of the curing agent is too large, the curing reaction of the silicone rubber composition proceeds too rapidly to cause a trouble of scorching.

It is of course optional according to need that the silicone rubber composition is admixed with a coloring agent in a limited amount of, for example, 0.5 to 3% by weight. Further, the silicone rubber composition can be admixed with a light-diffusing agent, aging retarder and the like each in a limited amount.

The part of the cured silicone rubber forming the inventive two-parts composite body should have a Shore A hardness in the range from 30 to 80 depending on the particularly intended application of the composite body. When the two-parts composite body is a push button switch covering member, for example, the Shore A hardness of the silicone rubber part is preferably in the range from 30 to 60 in consideration of various factors such as the dimensions of the riser part and form and dimensions of the keytop base as well as the arrangement of the unit push button switches. When the inventive two-parts composite body is a coaster for serving a drink cup, flower vase rest and the like having a generally flat configuration of the silicone rubber part, the Shore A hardness of the silicone rubber part can be selected in the range from 30 to 80 depending on the condition of the table surface or floor surface which is contacted by the surface of the silicone rubber base as well as other requirements such as ruggedness compensation, resting stability and so on.

Other applications of the inventive two-parts composite body of the invention include, for example, resin-made toys with a rubber part, resin-made hammers with a rubber head, silicone rubber-based interconnectors with a resin frame and heat-sensitive rollers as well as various kinds of resin-made wares mounted on a swaying table as in a navigating vessel to be prevented from slipping on the table. These two-parts composite bodies can be subjected to a secondary work such as printing according to need by using a printing ink or coating composition of which the vehicle resin is preferably a polyester-based or urethane-based resin.

In the following, the two-parts composite body of the invention is illustrated in more detail taking a push button switch covering member as a typical example.

Needless to say, a great variety of designs are possible for push button switch covering members relative to the shapes and dimensions of the keytop, arrangement of the unit switches and other factors. For example, the keytop can be in a square, rectangular, circular or elliptic form having a thickness of 0.5 to 50 mm and a plan area of 0.3 to 5000 mm². The riser part can be designed merely to serve for connecting the base part and the keytop base but can be in the form of a dome-like projection imparted with elastic resilience for bending and recovery.

The keytop is molded from the inventive thermosetting resin composition comprising, per 100 parts by weight of an unsaturated polyester resin, 20 to 50 parts by weight of an ethylenically unsaturated polymerizable compound, 5 to 30 parts by weight of an epoxy resin, 2 to 20 parts by weight of a melamine resin, 0.1 to 2 parts by weight of a radical-reactive curing agent and 0.1 to 2 parts by weight of an acidic catalyst. The thickness of the keytop is preferably at least 0.5 mm while the body of the push button switch covering member consisting of the base part, riser part and keytop base is molded from a silicone rubber composition in such dimensions as to exhibit mechanical behavior and strengths sufficient for practical use. Since the linear molding shrinkage of the inventive thermosetting resin composition is about 3 to 5% to be approximately equivalent to that of the silicone rubber composition, the otherwise unavoidable troubles such as warping and distortion due to the difference in the molding shrinkage between the two parts never take place by the integral bonding of the resin part and the silicone rubber part.

The above mentioned lower limit 0.5 mm of the thickness of the keytop molded from the inventive thermosetting resin composition is proposed in order for the keytop to have a sufficient mechanical strength to pass the dropping-weight impact test described later. When the thickness thereof is too small, cracks are sometimes formed therein by dropping the weight. The thickness of the silicone rubber layer is preferably in the range from 0.5 to 1 mm in consideration of the dimensional accuracy of the metal mold for the preparation of the covering member. Desirably, intermixing of the thermosetting resin composition to the silicone rubber composition forming, in particular, the riser part should be avoided since otherwise no adequate and pleasant feeling of switch pushing can be obtained.

The silicone rubber composition can be conventional without particular requirements and prepared in a conventional manner. Namely, a silicone rubber compound, curing agent and, optionally, coloring agent as well as other additives are thoroughly blended together by using a rubber processing machine such as milling rollers, kneaders and the like and the thus obtained silicone rubber composition is preliminarily molded into so-called preforms having an adequate size and thickness suitable for the molding works, for example, in the form of a sheet.

The thermosetting resin composition is prepared by uniformly mixing the essential ingredients and optional additives including coloring agents by using a suitable blending machine. The blending work can be performed for all of the ingredients altogether at one time or, preferably, the admixture of the radical-reactive curing agent is postponed until a uniform blend of the other ingredients is formed in the blending machine. It is desirable to eliminate any air bubbles contained in the flowable thermosetting resin composition by applying a reduced pressure before molding.

The molding process of the push button switch covering member according to the invention is performed by first molding the keytop from the thermosetting resin composition in the cavity of a metal mold followed by molding of the silicone rubber part either by injection molding or by compression molding so that the resin part and the silicone rubber part are firmly and integrally bonded together even without using any adhesives. The molding process is illustrated in further detail by making reference to FIGS. 1A to 1E of the accompanying drawing.

As is illustrated in FIG. 1A by a vertical cross sectional view, the cavity of a lower mold 3 is filled with a flowable thermosetting resin composition 2 discharged out of the nozzle 1 under pressurization with an air dispenser or tubular pump (not shown in the figure). The flowable resin composition 2 filling the cavity of the metal mold 3 is heated in situ to effect curing to such an extent that at least the surface layer of the resin pool 2 loses flowability (see FIG. 1B). Thereafter, as is illustrated in FIG. 1C, a preform sheet 4 of the silicone rubber composition is mounted on the lower mold 3 to cover the already cured resin part 6 as the keytop. The metal mold is closed with the lower mold 3 and the upper mold 5 and kept as such at an elevated temperature for a specified length of time as is illustrated in FIG. 1D so that the silicone rubber composition 4 is compression-molded and cured to give a push button switch covering member consisting, as is illustrated in FIG. 1E, of the silicone rubber part formed from the base part 10, riser part 9 and keytop base 7 and the resin part 6 as the keytop made from the inventive thermosetting resin composition as taken out of the metal mold.

While the silicone rubber composition in the above described procedure is molded and cured by the method of compression molding, it is also possible that the silicone rubber composition is molded and cured by the method of injection molding in which the silicone rubber composition is introduced into the metal mold closed with the lower mold 3 and upper mold 5 over the already cured resin part 6.

The molding and curing conditions of the thermosetting resin composition and the silicone rubber composition naturally depend on the types of the respective compositions, dimensions of the product and other factors so that the actual conditions must be established in advance by undertaking preliminary molding tests.

In the thermosetting resin composition of the invention, the roles played by the respective ingredients are presumably as follows. Namely, the ethylenically unsaturated polymerizable compound as the component (b) pertains to bonding of the resinous part and the silicone rubber part. The epoxy resin as the component (c) has an effect to decrease the molding shrinkage of the resin composition along with an improving effect on the mechanical strengths of the resin composition after curing. The melamine resin as the component (d) has an effect of preventing curing retardation of the resin composition, in particular, within the surface layer in contact with the atmospheric air. The radical-reactive curing agent as the component (e) and the acidic catalyst as the component (f) act on the unsaturated polyester resin as the component (a) and on the melamine resin as the component (d), respectively, to ensure complete curing of the resin composition.

By virtue of the synergism exhibited by the above described ingredients, the inventive thermosetting resin composition can be molded and cured on a silicone rubber composition to be firmly and integrally bonded together forming strong chemical bonds even without using any adhesives or primers. Since the principal ingredient of the resin composition is an unsaturated polyester resin as the component (a), the resin composition after curing is excellently transparent without the disadvantage of yellowing so that the resin in part can easily be colored in any desired colors.

In the following, some particular embodiments of the present invention are described by way of Examples, which are preceded by several preliminary tests to establish adequate formulations of the inventive thermosetting resin composition. The term of "parts" for the amount of materials in the following description always refers to "parts by weight".

Preliminary Test 1.

Resin compositions were prepared by compounding 100 parts of a commercial product of an unsaturated polyester resin (Estar 1510C, a trade name, supra) as the component (a) with 15 to 50 parts of diallyl phthalate as an ethylenically unsaturated polymerizable compound as the component (b) and a varied amount of up to 2.5 parts of a radical-reactive curing agent (Niper BO, a trade name) as the component (e). Each resin composition was cast into the molding cavity (15 mm diameter and 5 mm depth) of a metal mold at a temperature of 50° C. and kept standing therein for 1 minute followed by contacting of the resin surface with a tip of tweezers to examine the curing condition of the resin composition in the surface layer.

The results of the test were as follows. When the component (e) was omitted, no curing could be noted. Curing of the resin composition could be noted when the amount of the component (b) was 20 or 35 parts and the amount of the component (e) was 0.1 part or when the amount of the component (b) was 50 parts and the amount of the component (e) was 2 parts. When the amount of the component (b) was 20 or 50 parts and the amount of the component (e) was 2.5 parts, cracks were found on the cured surface of the resin composition.

Preliminary Test 2.

Thermosetting resin compositions were prepared each by compounding a base composition, which consisted of 100 parts of the unsaturated polyester resin, 35 parts of diallyl phthalate and 1 part of the radical-reactive curing agent, each being the same one as used in Preliminary Test 1 above, with 4 to 35 parts of a commercial product of an epoxy resin (Brenmar G, a trade name) as the component (c). Each resin composition was cast into a rectangular cavity (20 mm length, 15 mm width and 5 mm depth) of a metal mold at a temperature of 150° C. and kept standing therein for 1 minute to give a cured block which was subjected to the measurement of the linear molding shrinkage in %. Separately, a circular molding cavity (15 mm diameter and 2 mm depth) of another metal mold was filled with the same resin composition as above which was cured under the same curing schedule as above to give a cured disk of the resin composition which was subjected to the dropping-weight impact test by the procedure described below.

The results of the impact test were that, when the amount of the component (c) was 4 parts, the test specimen could not withstand the impact with the weight dropped from a height of 60 cm while the other test specimens could withstand the impact by a weight dropped from a height of 200 cm. The results of the measurement of the molding shrinkage are as shown in Table 1 below. When the amount of the component (c) was 35 parts, the cured block could not be taken out of the rectangular molding cavity due to too small shrinkage so that the linear shrinkage by molding could not be determined. These results indicate that the amount of the component (c) should be in the range from 5 to 30 parts.

TABLE 1

| Epoxy resin, parts | 4 | 5 | 20 | 25 | 30 |
|---|---|---|---|---|---|
| Molding shrinkage, % | 5.0 | 4.0 | 3.8 | 3.5 | 3.0 |

Dropping-weight impact test

Figure 2A:
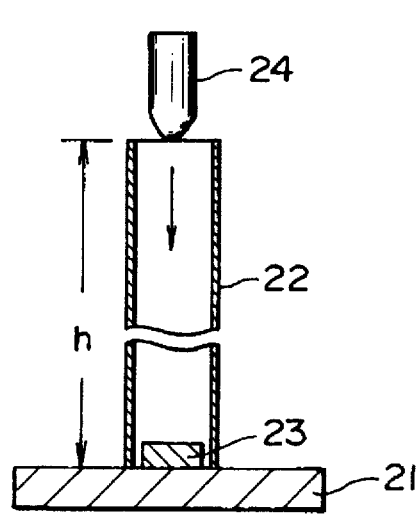
FIG. 2A is a schematic illustration of the testing method for the impact strength of the test specimen by dropping a conical-head dropping weight by a vertical cross sectional view and FIG. 2B is an axial cross sectional view of the conical-head dropping weight.
Figure 2B:
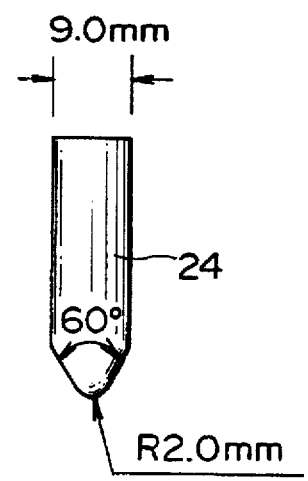

FIG. 2A illustrates the device for the impact test and FIG. 2B illustrates an axial cross sectional view of the weight dropped onto the test specimen using the device. Thus a straight pipe 22 having an inner diameter of 9.8 mm was held standing upright on a base table 21 to cover the test specimen 23 on the base floor 21. A weight of a metal 24 having a diameter of 9.0 mm and a conical lower end of an apex angle of 60°, which had a rounded tip of 2.0 mm radius of curvature and weighing 4 g, was dropped from a height h (cm) to hit the test specimen below which was examined for the occurrence of indents or cracks. When the weight 24 was dropped from a height of 200 cm or lower and no defects were detected in the test specimen 23, the specimen passed the test as a criterion.

Preliminary Test 3.

Thermosetting resin compositions were prepared each by compounding a base composition, which consisted of 100 parts of the unsaturated polyester resin, 35 parts of diallyl phthalate, 1 part of the radical-reactive curing agent and 25 parts of the epoxy resin, each being the same one as used in Preliminary Test 2 above, with 1 to 25 parts of a commercial product of a melamine resin (Cymel 303, a trade name) as the component (d) and up to 2.5 parts of an acidic catalyst (Catalyst 4050, a trade name) as the component (f). Each resin composition was poured into a rectangular cavity (45 mm length, 20 mm width and 7 mm depth) of a metal mold at a temperature of 150° C. and kept standing therein for 40 seconds to give a cured block. In the next place, a preform sheet of a silicone rubber composition prepared from 100 parts of a silicone rubber compound (KE 951U, a product by Shin-Etsu Chemical Co.) and 2 parts of a curing agent (C-8, a product by the company supra) was put to cover the exposed surface of the cured resin block in the cavity and to fill the remaining space of the cavity for silicone rubber molding and compression-molded by closing the metal mold for 3 minutes under a pressure of 200 kgf/cm$^2$ so that the silicone rubber as cured was bonded to the surface of the resin part. The thus obtained two-parts composite body was taken out of the metal and inspected for the intrusion of the resin composition into the silicone rubber part by flowing and for the curing condition of the thermosetting resin composition. The amounts of the components (d) and (f) and the results of the inspection of the composite bodies were as shown in Table 2 below.

Figure 3A:
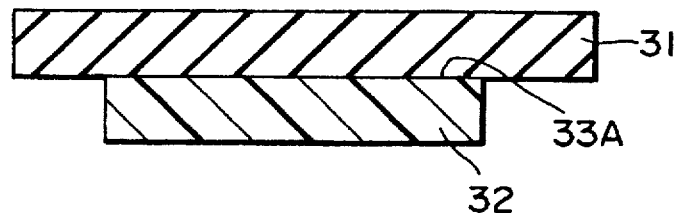
FIGS. 3A and 3B each illustrate a vertical cross sectional view showing the bonding state between layers of a thermosetting resin and a silicone rubber with a flat interface or with an irregularly undulated interface, respectively.
Figure 3B:
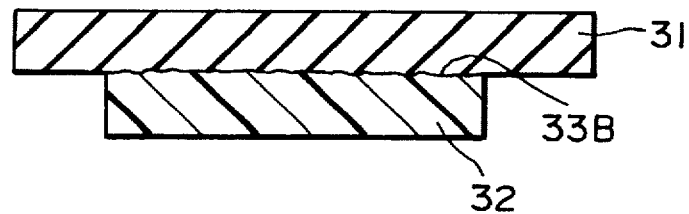

FIGS. 3A and 3B each illustrate a vertical cross sectional view of the thus obtained two-parts composite body consisting of the resin part 32 and the silicone rubber part 31 bonded together at the interface 33A or 33B, respectively. When the thermosetting resin composition was formulated with 2 to 20 parts of the melamine resin and 0.1 to 2 parts of the acidic catalyst, the two parts 31, 32 were bonded together at a flat and smooth interface 33A without intrusion of the resin composition 32 into the silicone rubber part 31 as is shown in FIG. 3A while, when the amounts of these two ingredients were not within the above mentioned ranges, the interface 33B was not flat and smooth but undulated as is shown in FIG. 3B. The results of the visual inspection of the thus prepared test specimens are summarized in Table 2 below, in which the interface undulation is rated in three ratings of A, B and C for the small undulation, medium undulation and large undulation, respectively, and the state of curing is rated in three ratings of A, B and C for fully acceptable curing, incomplete curing and no curing or curing but with void formation, respectively.

TABLE 2

| Melamine resin, parts | Acidic catalyst, parts | Interface undulation | State of curing |
| --- | --- | --- | --- |
| 1 | 0.1 | C | A |
| 2 | — | B | C |
| 2 | 1 | A | A |
| 10 | 2 | A | A |
| 10 | 2.5 | A | C |
| 20 | 0.1 | A | A |
| 20 | 2 | A | A |
| 25 | 1 | A | B |

Preliminary Test 4.

The above described results of the Preliminary Tests 1 to 3 were utilized for the selection of a preferable formulation of the thermosetting resin composition according to the invention, which consisted of: 100 parts of the unsaturated polyester resin as the component (a), 35 parts of diallyl phthalate as the component (b), 25 parts of the epoxy resin as the component (c), 15 parts of the melamine resin as the component (d), 1 part of the radical-reactive curing agent as the component (e) and 1 part of the acidic catalyst as the component (f).

Cured test specimens, in the form of a 45 mm by 20 mm by 7 mm block or in the form of a disk having a diameter of 15 mm and thickness of 2 mm, were prepared by the method of cast molding from this thermosetting resin composition, referred to as the resin composition A hereinafter, as well as from the thermosetting resin compositions disclosed in Japanese Patent Kokai 6-3059988 and 660767, referred to as the resin compositions B and C, respectively, hereinafter, for comparative purpose. The resin composition B was prepared from 100 parts of a dimethyl diphenyl silicone resin admixed with 10 parts of a curing agent and 0.4 part of a curing catalyst while the resin composition C was prepared from 100 parts of ethyleneglycol dimethacrylate and 1 part of 2,5-dimethyl-2,5-di (tert-butylperoxy) hexane.

The test specimens were subjected to various tests for the physical properties. The results were as shown in Table 3 below. The "guitar pick test" given in the table was undertaken in the following manner. Thus, the test specimen in the form of a disk was repeatedly hit in a perpendicular direction with a guitar pick of medium hardness which was moved reciprocatingly up and down at a constant velocity and at a constant frequency of 2 times/second under a load of 500 g until defects or cracks were first detected on the surface of the test specimen to record the number of hitting times. The results of this test given in Table 3 for the resin compositions A, B and C correspond to the pencil hardness of 3H, H and F, respectively.

TABLE 3

| Resin composition | A | B | C |
| --- | --- | --- | --- |
| Curing temperature, °C. | 140 | 180 | 165 |
| Curing time, minutes | 2 | 1 | 1 |
| Molding shrinkage, % | 3–4 | 3–4 | 7–8 |
| Light transmission, % | 85–90 | 65–70 | 85–92 |
| Impact strength, cm | 200 | 60 | 200 |
| Shore D hardness | 85 | 80 | 55 |
| Guitar pick test, $\times 10^4$ times | 30 | 25 | 10 |

Preliminary Test 5.

A curable silicone rubber composition was prepared by blending 100 parts of a silicone rubber compound (KE 951U, supra) with 2 parts of the curing agent (C-8) recommended by the producer of the silicone rubber. One of the resin compositions A, B and C used in Preliminary Test 4 described above was subjected to integral molding in a metal mold having a plurality of molding cavities with different dimensions to give a test specimen of a two-parts composite body as a simulation of the keytop part of a push button switch covering member having different thickness of the resin part and different keytop area as indicated in Table 4 below together with the total thickness of the keytop part consisting of the resin part and the silicone rubber part. The test specimens were subjected to the dropping-weight impact test and the results under the heading of IS in Table 4 were rated in two ratings of A and B for high and low strengths, respectively, as is shown in Table 4. In the table, the time "C" is the length of time in seconds from casting to apparent completion of curing of the resin composition and the time "B" is the maximum delayable casting time of the silicone rubber composition in minutes from casting of the resin composition to accomplish good bonding between the cured resin part and the silicone rubber part.

TABLE 4

| Key top dimensions | | | Resin composition | | | | | | | | |
| --- | --- | --- | --- | --- | --- | --- | --- | --- | --- | --- | --- |
| | | | A | | | B | | | C | | |
| Total thickness, mm | Resin layer, thickness mm | Top area, mm² | IS | Time C | Time B | IS | Time C | Time B | IS | Time C | Time B |
| 2.3 | 0.3 | 5 | B | 10 | 10 | B | 10 | 60 | B | 10 | 2 |
| 2.3 | 0.5 | 5 | A | 10 | 10 | B | 10 | 60 | A | 10 | 2 |
| 2.3 | 2.2 | 5 | A | 10 | 10 | B | 10 | 60 | A | 10 | 2 |
| 3.5 | 2.5 | 5 | A | 10 | 10 | B | 10 | 60 | A | 10 | 2 |
| 3.5 | 0.9 | 5 | B | 10 | 10 | B | 10 | 60 | B | 10 | 2 |
| 10.0 | 7.0 | 5 | A | 10 | 10 | A | 10 | 60 | A | 10 | 2 |
| 10.0 | 9.0 | 5 | A | 10 | 10 | A | 10 | 60 | A | 10 | 2 |
| 25.0 | 17.5 | 5 | A | 15 | 10 | A | 15 | 60 | A | 15 | 2 |
| 25.0 | 23.8 | 5 | A | 15 | 10 | A | 15 | 60 | A | 15 | 2 |
| 2.3 | 0.4 | 20 | B | 10 | 10 | B | 10 | 60 | B | 10 | 2 |
| 2.3 | 1.1 | 20 | A | 10 | 10 | B | 10 | 60 | A | 10 | 2 |
| 2.3 | 1.5 | 20 | A | 10 | 10 | B | 10 | 60 | A | 10 | 2 |
| 3.5 | 2.5 | 20 | A | 10 | 10 | B | 10 | 60 | A | 10 | 2 |
| 3.5 | 3.3 | 20 | A | 15 | 10 | A | 15 | 60 | A | 15 | 2 |

TABLE 4-continued

| Key top dimensions | | | Resin composition | | | | | | | | |
|---|---|---|---|---|---|---|---|---|---|---|---|
| Total thickness, mm | Resin layer, thickness mm | Top area, mm² | A | | | B | | | C | | |
| | | | IS | Time C | Time B | IS | Time C | Time B | IS | Time C | Time B |
| 10.0 | 7.0 | 20 | A | 15 | 10 | A | 15 | 60 | A | 15 | 2 |
| 10.0 | 9.5 | 20 | A | 20 | 10 | A | 20 | 60 | A | 20 | 2 |
| 25.0 | 17.5 | 20 | A | 20 | 10 | A | 20 | 60 | A | 20 | 2 |
| 25.0 | 23.8 | 20 | A | 20 | 10 | A | 20 | 60 | A | 20 | 2 |
| 2.3 | 1.0 | 150 | A | 20 | 10 | B | 20 | 60 | A | 20 | 2 |
| 2.3 | 1.8 | 150 | A | 20 | 10 | B | 20 | 60 | A | 20 | 2 |
| 3.5 | 2.0 | 150 | A | 20 | 10 | B | 20 | 60 | A | 20 | 2 |
| 3.5 | 2.3 | 150 | A | 20 | 10 | B | 20 | 60 | A | 20 | 2 |
| 10.0 | 6.0 | 150 | A | 30 | 10 | A | 30 | 60 | A | 30 | 2 |
| 10.0 | 9.5 | 150 | A | 30 | 10 | A | 30 | 60 | A | 30 | 2 |
| 25.0 | 17.5 | 150 | A | 40 | 10 | A | 40 | 60 | A | 40 | 2 |
| 25.0 | 23.8 | 150 | A | 40 | 10 | A | 40 | 60 | A | 40 | 2 |
| 2.3 | 0.4 | 300 | B | 20 | 10 | B | 20 | 60 | B | 20 | 2 |
| 2.3 | 1.0 | 300 | A | 20 | 10 | B | 20 | 60 | A | 20 | 2 |
| 3.5 | 2.5 | 300 | A | 20 | 10 | B | 20 | 60 | A | 20 | 2 |
| 3.5 | 3.0 | 300 | A | 30 | 10 | A | 30 | 60 | A | 30 | 2 |
| 10.0 | 7.0 | 300 | A | 30 | 10 | A | 30 | 60 | A | 30 | 2 |
| 10.0 | 9.5 | 300 | A | 40 | 10 | A | 40 | 60 | A | 40 | 2 |
| 25.0 | 0.8 | 300 | B | 20 | 10 | B | 20 | 60 | B | 20 | 2 |
| 25.0 | 23.0 | 300 | A | 50 | 10 | A | 50 | 60 | A | 50 | 2 |
| 2.3 | 1.3 | 5000 | A | 200 | 10 | B | 200 | 60 | A | 200 | 2 |
| 2.3 | 1.8 | 5000 | A | 300 | 10 | B | 300 | 60 | A | 300 | 2 |
| 3.5 | 2.5 | 5000 | A | 300 | 10 | B | 300 | 60 | A | 300 | 2 |
| 3.5 | 3.3 | 5000 | A | 300 | 10 | A | 300 | 60 | A | 300 | 2 |
| 10.0 | 7.0 | 5000 | A | 400 | 10 | A | 400 | 60 | A | 400 | 2 |
| 10.0 | 9.0 | 5000 | A | 400 | 10 | A | 400 | 60 | A | 400 | 2 |
| 25.0 | 17.5 | 5000 | A | 600 | 10 | A | 600 | 60 | A | 600 | 2 |
| 25.0 | 23.8 | 5000 | A | 600 | 10 | A | 600 | 60 | A | 600 | 2 |

EXAMPLE 1

A flowable thermosetting resin composition according to the invention was prepared by uniformly blending, in a mixing machine for 30 minutes, 100 parts of an unsaturated polyester resin (Polylite 8400), 40 parts of diallyl phthalate monomer (Daisodap Monomer, a product by Daiso Co.), 40 parts of an epoxy resin (Epolite 3002), 15 parts of a melamine resin (Cymel 303), 0.5 part of a radical-reactive curing agent (Niper BO), 0.5 part of an acidic catalyst (Catalyst 4040) and 0.5 part of a coloring agent (BK-0002-BP, a product by Novotek Co.).

Separately, a curable silicone rubber composition was prepared by roll milling from 100 parts of a silicone rubber compound (KE 951U) and 1 part of a radical-reactive curing agent (Perhexa 3M) and the silicone rubber composition was pre-molded into a sheet of a specified thickness which was cut to have specified dimensions.

As is illustrated in FIGS. 1A to 1E, the resin composition 2 was cast through an air dispenser nozzle 1 into the molding cavity in the lower mold 3 of a metal mold kept at 130° C. for compression molding of a push button switch covering member with the upper mold 5 lifted above the lower mold 3 to fill up the cavity and kept therein for 2 minutes to effect curing of the resin composition. Thereafter, the pre-molded sheet 4 of the silicone rubber composition was laid on the lower mold to cover the exposed surface of the cured resin part 6 and they were integrally compression-molded by closing the metal mold under a pressure of 200 kgf/cm² for 5 minutes at 130° C. to effect curing of the silicone rubber composition and bonding thereof to the surface of the cured resin part 6 to give an integrally formed push button switch covering member, which consisted of the cured silicone rubber part formed from the base part 10, riser part 9, keytop base 7 and the cured resin part of the keytop 6, was taken out of the metal mold 3,5.

As visually inspected, the thus obtained covering member had quite good and acceptable appearance without yellowing in the keytop part and the interface between the resin part and the silicone rubber part was flat and smooth showing no undulation. When the covering member was subjected to a tensile test on an automatic tensile testing machine, the covering member was destroyed by cohesive failure within the silicone rubber layer and not by adhesive failure at the interface between the resin part and the silicone rubber part indicating the very high bonding strength at the interface. Further, the keytop of the cured resin composition separated from the key top base of the silicone rubber by cutting with a knife was subjected to the repeated impact test to find that the impact strength thereof was very high.

EXAMPLE 2

A flowable thermosetting resin composition according to the invention was prepared by uniformly blending, in a mixing machine, 100 parts of an unsaturated polyester resin (Rigolac), 40 parts of vinyl toluene, 25 parts of an epoxy resin (Epiol NPG-100), 15 parts of a melamine resin (Cymel 232), 0.7 part of a radical-reactive curing agent (Perrmek N) and 0.6 part of an acidic catalyst (Catalyst 4050).

Separately, a curable silicone rubber composition was prepared by roll milling from 100 parts of a silicone rubber compound (KE 951U), 1 part of a radical-reactive curing agent (Perhexa 3M) and 5 parts of a fine powder (Siplon B, a product by Siplon Kasei Co.) as a light diffuser agent and the silicone rubber composition was sheeted in a specified thickness and cut to strips having specified dimensions.

Figure 4:
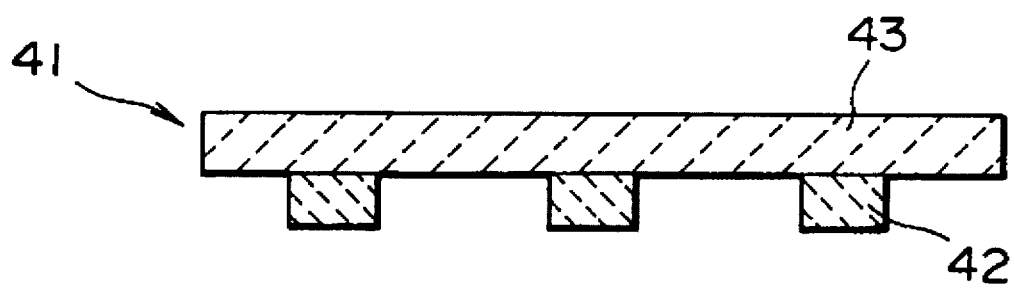
FIG. 4 is a vertical cross sectional view of a light-conducting member of a push button switch used in a dark place.

These resin and silicone rubber compositions were used in injection molding of a light-conducting member 41 for a push button switch to be used in a dark place as is illustrated in FIG. 4 by a vertical cross sectional view consisting of the light-conducting parts 42 made from a transparent resin composition and the light-diffusing part 43 made from a translucent silicone rubber composition. Thus, the flowable thermosetting resin composition was cast through an air dispenser into the cavity in a lower mold of a metal mold at 140° C. for the light-conducting parts 42 and kept therein for 45 seconds to effect curing. After closing the metal mold, the silicone rubber composition held in the material chamber of the injection molding machine was injected into the cavity of the metal mold through an injection nozzle and cured therein under a pressure of 180 kgf/cm$^2$ for 5 minutes at the same temperature as above.

The thus obtained light-conducting member 41 as taken out of the metal mold was resiliently flexible with the light-diffusing part 43 made from a cured silicone rubber so that the assembling work thereof to a push button switch panel could be facilitated with versatility. By virtue of the very high transparency and excellent mechanical strength of the light-conducting parts 42 made from the resin composition, the thickness of the light-conducting parts 42 could be as small as 1 mm or smaller enabling reduction of the overall thickness of the push button switch covering member while such a small thickness of the light-conducting parts 42 was impossible with conventional high-hardness silicone resins.

EXAMPLE 3

A flowable thermosetting resin composition according to the invention was prepared by uniformly blending in a mixing machine, 100 parts of an unsaturated polyester resin (Estar CL2170), 50 parts of styrene, 15 parts of an epoxy resin (Light Ester DE), 17 parts of a melamine resin (Cymel 701), 2 parts of a radical-reactive curing agent (Permek V) and 0.9 part of an acidic catalyst (Catalyst 296-9).

Separately, a curable silicone rubber composition was prepared by roll milling from 100 parts of a silicone rubber compound (MM 3705, a product by Rhone-Poulenc Co.) and 2 parts of a curing agent (C-2).

Figure 5:
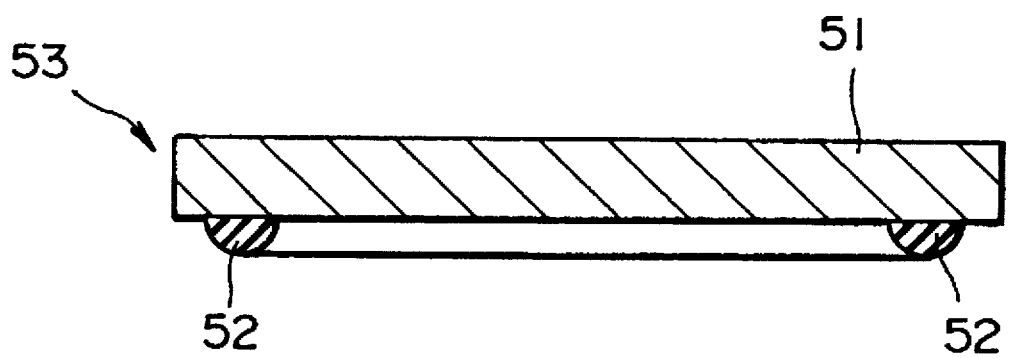
FIG. 5 is an axial cross sectional view of a resinous blind flange integrally provided with an elastic packing.

These resin and silicone rubber compositions were used in compression molding of a blind flange 53 consisting of a disk 51 of the cured resin composition and a ring packing 52 of the silicone rubber having a semicircular cross section as is illustrated in FIG. 5 by an axial cross sectional view. Thus, the flowable resin composition prepared above was poured through an air dispenser nozzle into the molding cavity in a lower mold of the metal mold at 100° C. for the disk part and kept there for 60 seconds to effect curing. Thereafter, the silicone rubber composition was extruded from a extruding nozzle connected to a plunger pump into the molding cavity for the packing part followed by closing of the metal mold for compression molding under a pressure of 100 kgf/cm$^2$ for 5 minutes. As visually inspected, the thus obtained two-parts blind flange 53 had quite excellent appearance with flat and smooth interface between the disk part 51 of the cured resin composition and the packing part 52 of the cured silicone rubber composition. The disk part 51 had high mechanical strengths and could be colored in any desired color to meet the requirement for an aesthetic design.

EXAMPLE 4

A flowable thermosetting resin composition according to the invention was prepared by uniformly blending, in a mixing machine, 100 parts of an unsaturated polyester resin (Estar CO600-1), 43 parts of triallyl cyanurate, 30 parts of an epoxy resin (Blenmar G), 30 parts of a melamine resin (Cymel 232), 2 parts of a radical-reactive curing agent (Niper BMT-K40), 2 parts of an acidic catalyst (Catalyst 4050) and 3 parts of a coloring agent (BK-0002BP).

Separately, a curable silicone rubber composition was prepared by roll milling from 100 parts of a silicone rubber compound (SE 4705, a product by Toray Dow Corning Corp.), 1 part of a radical-reactive curing agent (Perbutyl I, a product by Nippon Oil & Fat Co.) and 1 part of a coloring agent (Color W-2, a product by Shin-Etsu Chemical Co.). This silicone rubber composition was pre-molded into a disk having a specified diameter and specified thickness.

These resin and silicone rubber compositions were used in compression molding of a coaster 64 with a rubber base 63 on the bottom of the resin-made coaster body 62 as is illustrated in FIG. 6 by an axial cross sectional view (a cup 61 added thereon). Thus, the flowable resin composition was cast into the molding cavity of a metal mold for the coaster body 62 kept at 150° C. through an air dispenser nozzle and kept therein for 3 minutes to effect curing. Thereafter, the pre-molded silicone rubber composition was introduced to the metal mold which was closed to cure the silicone rubber composition for 4 minutes under a compressive pressure of 200 kgf/cm$^2$. The coaster 64 taken out of the metal mold was an integral body consisting of the resin-made coaster body 62 and a base 63 of the cured silicone rubber bonded together without any adhesive layer intervening therebetween. This rubber-based coaster 64 is useful for use without the troubles of slipping even on a swaying table as in a navigating vessel. By virtue of the good matching in the molding shrinkage between the resin-made coaster body 62 and the rubber base 63, the coaster 64 is free from warping or distortion showing excellent appearance.

What is claimed is:

1. A two-parts composite body which is an integral body consisting of:

(A) a first cured part molded from a silicone rubber composition, of which the organopolysiloxane molecules have at least one vinyl group bonded to the silicon atom in a molecule; and (B) a second cured part molded from a thermosetting resin composition comprising, as a uniform blend:

(a) 100 parts by weight of an unsaturated polyester resin;

(b) from 20 to 50 parts by weight of an ethylenically unsaturated polymerizable compound;

(c) from 5 to 30 parts by weight of an epoxy resin;

(d) from 2 to 20 parts by weight of a melamine resin;

(e) from 0.1 to 2 parts by weight of a radical-reactive curing agent; and (f) from 0.1 to 2 parts by weight of an acidic catalyst, the first part and the second part being joined together without intervention of a layer of an adhesive at the interface.

2. The two-parts composite body as claimed in claim 1 in which the first part of a silicone rubber as the part (A) has a Shore A hardness in the range from 30 to 80 and the second part of a thermosetting resin as the part (B) has a Shore D hardness of 60 or higher.

* * * * *